(12) United States Patent
Smith (10) Patent No.: US 9,097,733 B2
(45) Date of Patent: Aug. 4, 2015

(54) SPEED SENSOR SYSTEM AND MOUNTING CONFIGURATION FOR LOCOMOTIVE TRACTION MOTORS

(76) Inventor: William L. Smith, Salem, SC (US)

( * ) Notice: Subject to any disclaimer, the term of this patent is extended or adjusted under 35 U.S.C. 154(b) by 632 days.

(21) Appl. No.: 13/467,345

(22) Filed: May 9, 2012

(65) Prior Publication Data

US 2013/0300262 A1 Nov. 14, 2013

(51) Int. Cl.
*G01P 3/488* (2006.01)
*G01P 3/481* (2006.01)
*H02K 11/00* (2006.01)
*G01P 1/02* (2006.01)
*G01D 11/24* (2006.01)

(52) U.S. Cl.
CPC .............. *G01P 1/026* (2013.01); *G01P 3/481* (2013.01); *G01P 3/488* (2013.01); *H02K 11/0021* (2013.01); *G01D 11/245* (2013.01)

(58) Field of Classification Search
CPC ....... H02K 11/021; G01P 3/488; G01P 3/481; G01P 1/026
USPC .................................................. 310/68 B, 83
See application file for complete search history.

(56) References Cited

U.S. PATENT DOCUMENTS

| 3,786,512 | A | 1/1974 | McCue et al. |
|---|---|---|---|
| 3,911,302 | A | 10/1975 | DeClaire |
| 3,930,189 | A | 12/1975 | Smith |
| 3,970,858 | A | 7/1976 | Rist et al. |
| 4,075,562 | A | 2/1978 | Karstensen et al. |
| 4,905,518 | A | 3/1990 | Kubler |
| 5,006,797 | A * | 4/1991 | Smith ........................... 324/173 |
| 5,387,039 | A | 2/1995 | Bien |
| 5,392,716 | A | 2/1995 | Orschek et al. |
| 5,629,567 | A | 5/1997 | Kumar |
| 5,756,894 | A | 5/1998 | Paolo et al. |
| 5,918,292 | A | 6/1999 | Smith |
| 6,133,729 | A | 10/2000 | Mierzwinski |
| 6,581,464 | B1 * | 6/2003 | Anderson et al. ............... 73/493 |
| 2002/0121820 | A1 * | 9/2002 | Grass ......................... 310/68 B |
| 2007/0176844 | A1 * | 8/2007 | Cislo ............................. 343/878 |
| 2008/0278399 | A1 * | 11/2008 | Nakajima et al. ............. 343/872 |
| 2009/0236921 | A1 * | 9/2009 | Karsch et al. .................... 310/71 |

OTHER PUBLICATIONS

International Search Report and Written Opinion for PCT/US2013/039618, dated Sep. 6, 2013, 10 pgs.

\* cited by examiner

*Primary Examiner* — Terrance Kenerly
(74) *Attorney, Agent, or Firm* — Womble Carlyle Sandridge & Rice, LLP (57) ABSTRACT

A speed sensor system for a locomotive traction motor of the type having a motor frame head adjacent each wheel truck, including a mounting bracket, attachable to the frame head at a prescribed distance from an axis of rotation of the motor and a sensor support portion extending from the inner surface through the ventilation opening and having a hollow tubular portion at the end for releasably receiving and positioning a separate sensor assembly in such a manner that the sensor itself is precisely positioned with respect to the armature gear surface of the traction motor.

11 Claims, 7 Drawing Sheets

SPEED SENSOR SYSTEM AND MOUNTING CONFIGURATION FOR LOCOMOTIVE TRACTION MOTORS

FIELD OF THE INVENTION

The present invention relates generally to the field of traction motor speed sensing, and, more particularly, to an improved speed sensor mounting configuration for locomotive traction motors.

BACKGROUND OF THE INVENTION

Locomotives typically employ a large diesel engine to drive an alternator, or alternatively are powered by externally supplied electricity. The electric power from the alternator or the external supply is conducted to traction motors located beneath a platform of the locomotive. The traction motors convert the electrical power to rotational mechanical power, and, when engaged and supplied through the axles, drive the wheels. The rotation of the wheels by the traction motors drives the locomotive along its rails.

The electrical power supplied to each traction motor is controlled or regulated to avoid spinning or locking of any one of the drive wheels. In order to properly control the operation of the traction motors, as well as to control traction and wheel rotation during breaking, it is necessary to obtain a signal corresponding to the speed of rotation of each respective traction motor. Thus, traction motor speed sensors for each of the rotating axles are required.

A conventional locomotive traction motor includes a motor frame head, which forms part of the motor frame. The motor frame is typically connected to a truck (locomotive) suspension supporting a frame, and the truck is connected to a platform suspension supporting the platform via the locomotive main sills. The frame head is disposed in a generally vertical plane, and contains multiple ventilation openings.

The environment of a locomotive traction motor is extremely harsh due to temperature extremes, vibration and shock loadings, dirt and chemical contamination, and magnetic fields. Thus, a speed sensor design must maximize its survivability within its intended environment. Additionally, extensive labor, time, and costs are involved in installing one of these assemblies. Unfortunately, because of the harsh operating environment, however, the sensor itself requires regular replacement.

There is known in the art a traction motor speed sensor assembly that includes a housing which is attached across a ventilation opening on the motor frame head. A sensor portion to which the sensor itself is hard-wired, which is integral to the housing, is cantilevered from a base portion of the housing and extends through the ventilation opening toward the axis of rotation.

SUMMARY OF THE INVENTION

The inventors of the present invention recognized problems attendant to the above design. First, since the sensor is integral to the assembly, and thus cannot be separately replaced with the prior art device, the entire assembly, including the mounting base, must be removed and replaced, requiring substantial labor, time, and cost. The present system, on the other hand, permits a sensor assembly alone to be replaced, without having to discard and replace the mounted base. Thus, the base need only be purchased once.

According to one aspect, the speed sensor system includes a specially designed mounting bracket and a sensor assembly. The mounting bracket includes a base with a width dimension that is sufficient to span the exterior of a ventilation opening on a frame head of a locomotive traction motor. The base is attachable to the frame head at a prescribed distance from an axis of rotation of the motor. A sensor support portion extends from the inner surface through the ventilation opening, generally parallel to the axis of rotation, and has a threaded aperture tubular portion at the end thereof for releasably receiving a sensor assembly. The tubular portion extends generally perpendicularly to the axis of rotation of the motor and has an interior with a threaded aperture configured to receive, align, and position the sensor assembly.

The sensor assembly itself includes a sensor housing or shell the sensor element itself inside the sensor housing, and an associated electrical cable. The sensor housing has an exterior surface that is configured complimentary to the interior configuration of the hollow tubular portion. According to another aspect, the exterior wall of the sensor housing is provided with a shoulder that engages a mating shoulder on the interior wall of the hollow tubular portion. The shoulders are so dimensioned with respect to the end of the sensor housing that, when seated within the tube, the sensor will be properly positioned and aligned within the mounting bracket relative to the traction motor axis of rotation. An electronic sensor is contained within the sensor housing, and a fastener is provided for securing the sensor housing to the sensor support. Lastly, an electrical cable portion is connected to the sensor housing for interconnecting the sensor to an external processing source.

Yet another aspect is a speed sensor for locomotive traction motors that is so configured as to be replaceable in a support bracket adjacent the motor. When so replaced it seats itself, when installed, in its proper location adjacent the motor armature gear without the necessity of adjustment.

Various features and aspects of the invention will become apparent upon review of the detailed description set forth below when taken in conjunction with the accompanying drawings, which are briefly described as follows.

DETAILED DESCRIPTION

Certain exemplary embodiments of the present invention are described below and illustrated in the accompanying figures. The embodiments described are only for purposes of illustrating the present invention and should not be interpreted as limiting the scope of the invention, which, of course, is limited only by the claims below. Other embodiments of the invention, and certain modifications and improvements of the described embodiments, will occur to those skilled in the art, and all such alternate embodiments, modifications, and improvements are within the scope of the present invention.

In general, one aspect of the invention is to provide a speed sensor system for monitoring the speed of a traction motor in which the speed sensing element can be replaced more easily and economically than by replacing the entire speed sensing system. Toward this end, the sensor assembly is replaceably mounted within a support bracket that does not need to be replaced. The sensor assembly includes a sensing element (sensor) encased in a sensor housing that can be removed from the support bracket and replaced, and an associated electrical cable. An important aspect of the invention is that the housing and surface of the support bracket that supports the housing are so configured that when the sensor housing or shell is fully seated, the sensor is precisely positioned with respect to the gear of the motor being sensed and no further calibration or adjustment is necessary. What follows is a description of one embodiment that has proven to be workable.

Figure 1:
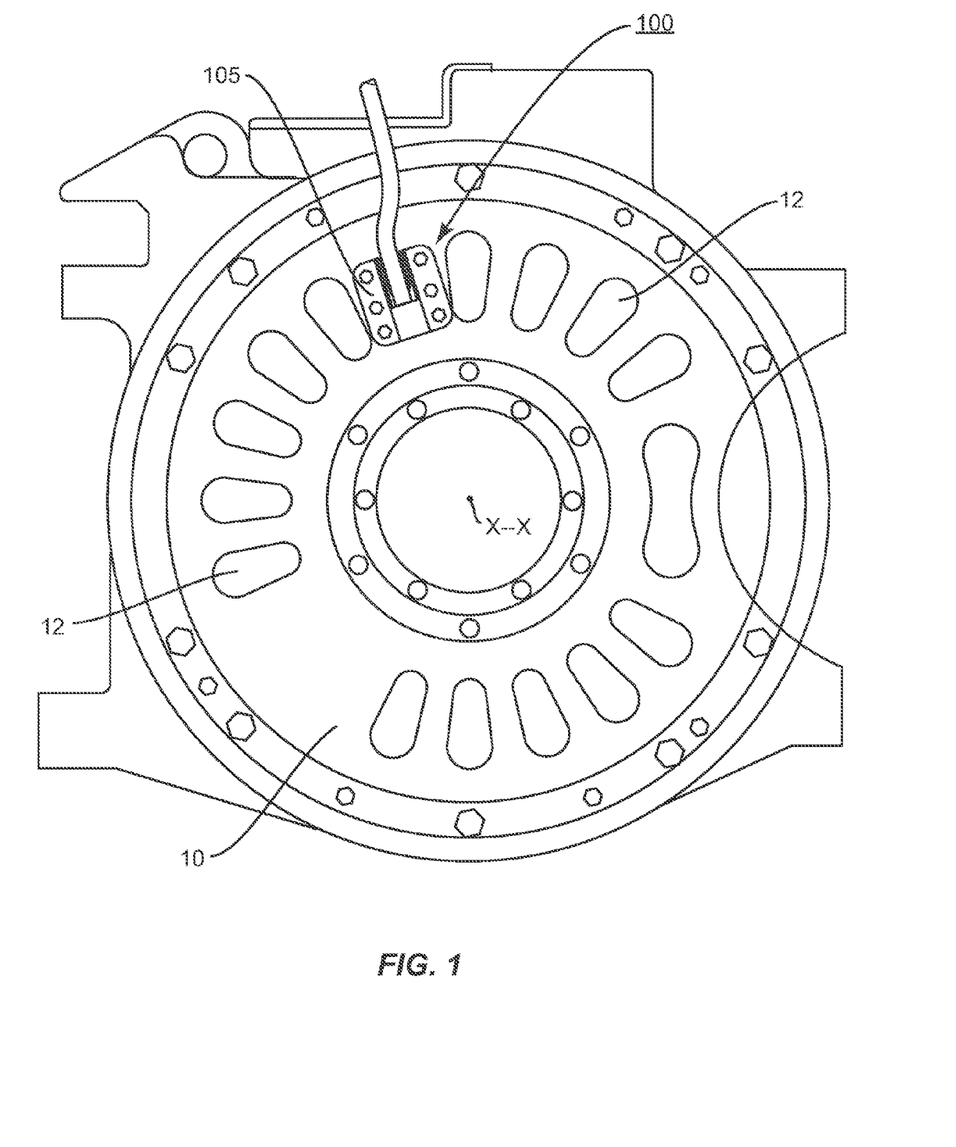
FIG. 1 is a side view of a locomotive motor frame head with the traction motor speed sensor assembly of the present invention installed thereon.
Figure 2:
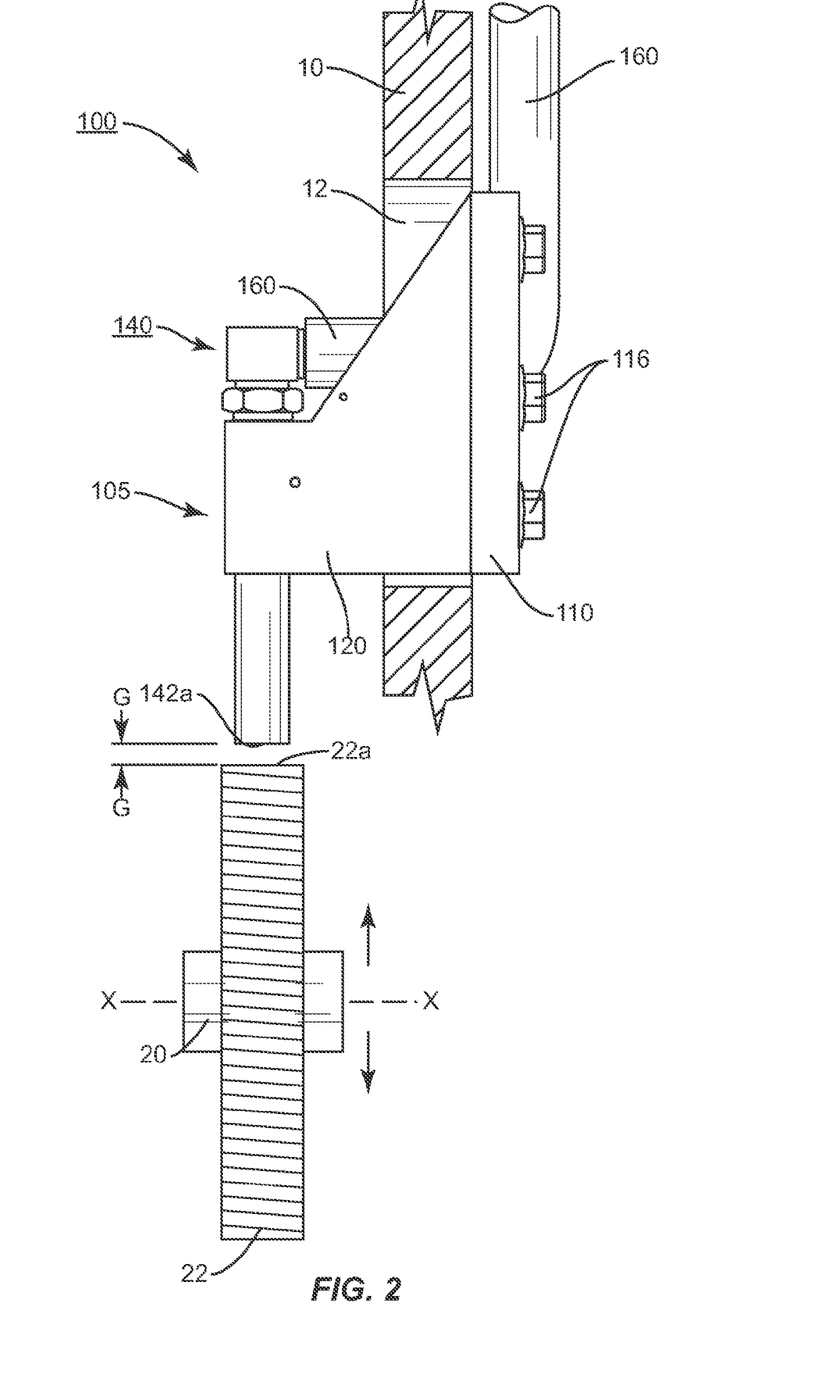
FIG. 2 is a side view of the traction motor speed sensor assembly of FIG. 1.

Referring now to the Figures in general, one aspect of the present invention is illustrated and directed to a speed sensor system for a locomotive traction motor, shown generally as 100. Turning first to FIGS. 1 and 2, the speed sensor system 100 is shown mounted on a conventional motor frame head 10 which forms part of the motor frame of the locomotive. The frame head 10 is disposed in a generally vertical plane, and contains a plurality of ventilation openings 12. As is well known in the art, the motor (not shown) contains a stationary stator portion and a rotating armature 22 providing rotation of an output shaft 20 about an axis of rotation X-X (see FIG. 2).

Figure 3A:
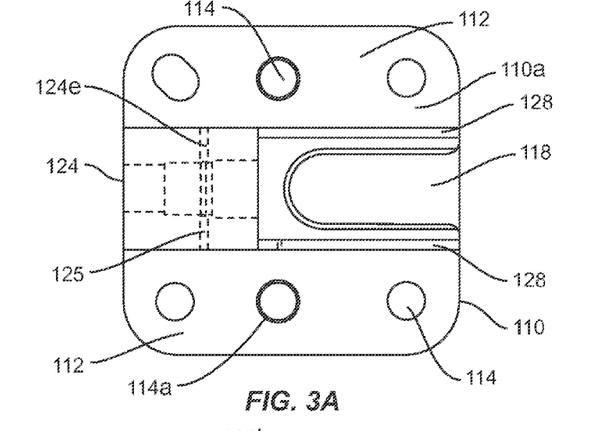
FIG. 3A is a back view of the mounting housing of the present invention alone.
Figure 3B:
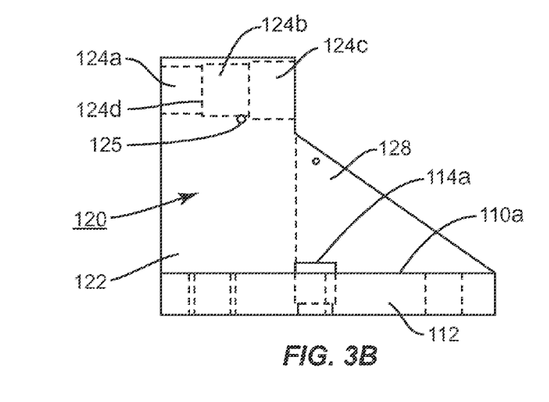
FIG. 3B is a side view of the mounting housing of FIG. 3A.
Figure 3C:
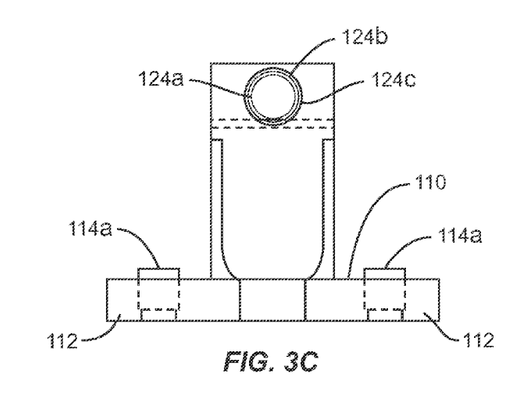
FIG. 3C is an end view of the mounting housing of FIG. 3A.

As shown in FIG. 2, one preferred embodiment of the speed sensor system 100 comprises a mounting bracket 105 having a base 110 and a sensor support portion 120, and a sensor assembly 140. To ensure that the bracket 105 comprises sufficient strength and resistance to the environment in which it is installed, including anticipated vibration during operation, one embodiment of the bracket 105 is machined from a solid block of stainless steel. This also ensures the necessary precision, as described in greater detail below, of the installed system 100 and eliminates welds. In this embodiment, the bracket 105 is machined from 300 series stainless steel. Stainless steel is used because it will not rust or corrode therefore ensuring its reuse. As best shown in FIGS. 3A through 3C, the base 110 comprises flange portions 112 on opposed sides, each including a plurality of mounting holes 114 for mounting on the outside of the frame head 10. The base 110, including flange portions 112, is sufficiently wide to span across a ventilation opening 12 formed through the frame head 10 of the locomotive traction motor. See FIG. 1. Conventional threaded fasteners 116, such as bolts, secure the flange portions 112 of the base 110 to the frame head 10. As shown in FIGS. 3A through 3C, at least two of the mounting holes 114 may include guide sleeves 114a, which project outwardly from the inner surface 110a of the base to insure precise spacing between mounting holes in the frame head 10 and the motor armature gear 22. In the embodiment shown, the base 110 also includes an elongated slot 118 for routing of an electrical signal cable 160 therethrough.

The sensor support portion 120 is formed to extend generally perpendicularly outwardly from the inner surface 110a of the base 110, so that when mounted, the sensor support portion 120 will lie in a path that is substantially parallel to the output shaft 20, and thus the axis of rotation of the motor (FIG. 2). As will be appreciated by those skilled in the art, and as shown in FIG. 2, a precise relationship between the surface 22a of the armature gear 22 and the sensor tip 142a of the traction motor speed sensor assembly 140 is critical to the accurate and proper functionality of the traction motor speed sensor. As shown in FIG. 2, the output shaft 20 comprises an armature gear 22 having a rotating outer edge 22a. A precise air gap G that can be closely held (0.020"-0.150" dependent on gear pitch) is required between the rotating outer edge 22a and the forward end 142a of the sensor housing 142.

In the embodiment shown the sensor support portion 120 comprises a sensor mounting portion 122 extending from the leading end of the base 110 (or end adjacent to the motor) with flanges 112, and a pair of opposed, spaced apart, and substantially parallel gussets 128 extending from the sensor mounting portion 122. The gussets provide additional rigidity to the sensor support portion 120 during operation of the locomotive. The sensor mounting portion 122 comprises a generally rectangular block, which is integrally formed with the base 110. Again, in the embodiment shown, the block is preferably formed of solid stainless steel (or other suitable material), except for a hollow tubular portion 124 that is machined completely through the upper portion of the block.

As shown in FIGS. 3A through 3C, the hollow tubular portion 124 comprises three generally circular and concentric hollow portions 124a, 124b, and 124c, each having a different diameter, as explained in greater detail below. The leading open end of hollow portion 124a has a first diameter, which is dimensioned to receive the forward end 142a of the sensor housing. The intermediate hollow portion 124b a second diameter that is slightly larger than the diameter of the leading hollow portion 124a. Lastly, the trailing hollow portion 124c has a slightly larger diameter than the intermediate hollow portion 124b and is threaded for receiving and securing the rearward end of the sensor housing. As will be appreciated, when formed in this manner, the difference in diameter of the portion 124a and portion 124b forms a "shoulder" 124d, which effectively serves as a stop against which a cooperating shoulder 142f of the sensor housing engages when installed in the hollow tubular portion 124. This insures the precise relationship between the armature gear and sensor tip described above. As also shown in the FIGS. 3A and 3C, a generally cylindrical thru hole 124e is drilled across and completely through the sensor support portion 120 and generally perpendicular to the axis of the hollow tubular portion 124. The cylindrical thru hole 124e is formed so that it intrudes slightly into the intermediate hollow portion 124b. Once the cylindrical thru hole 124e is formed, a first stainless steel pin, preferably a roll pin 125, having a length corresponding to the width of the support portion 120, is press fitted into the thru hole 124e. As described below, the roll pin 125 plays a key role in the proper alignment and positioning of the sensor assembly 140.

Figure 4:
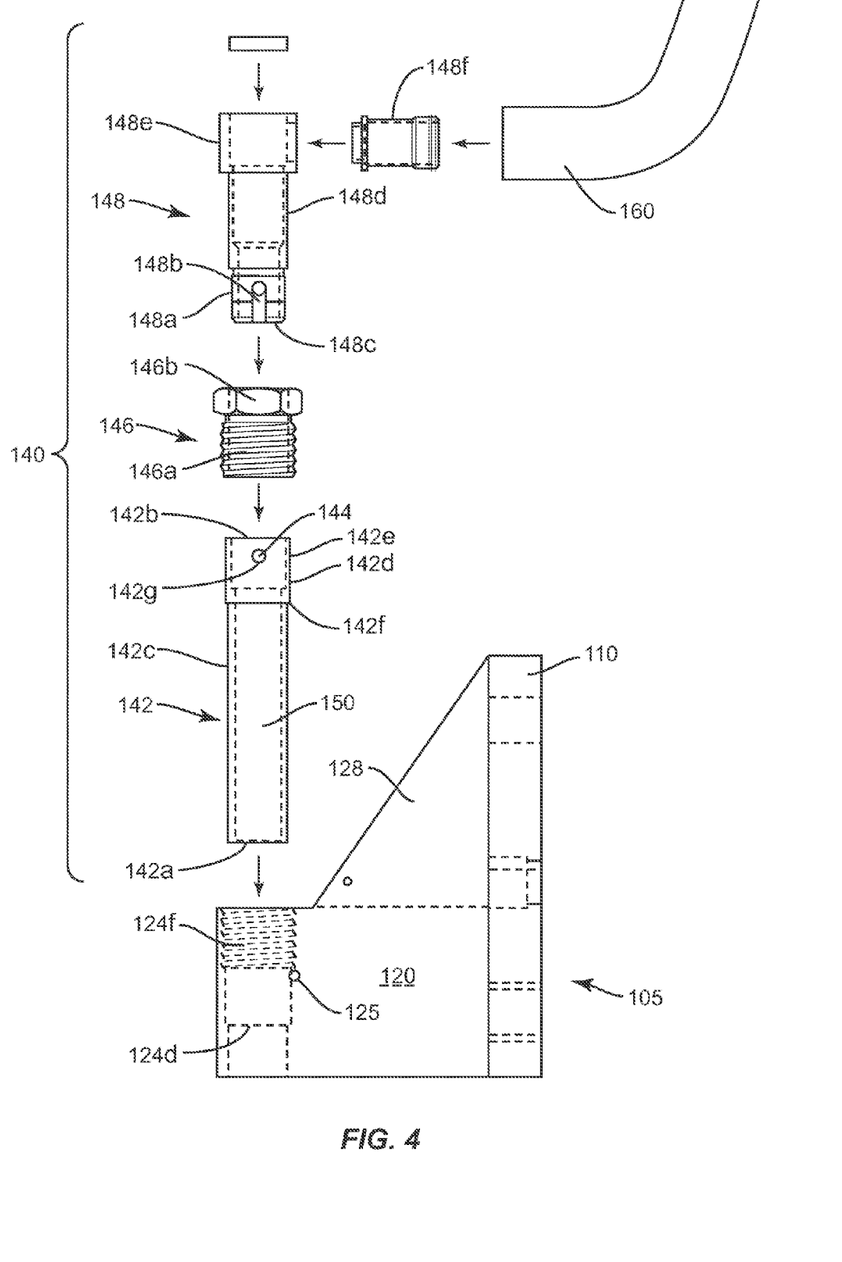
FIG. 4 is an exploded side view of the traction motor speed sensor assembly of FIG. 1.
Figure 5:
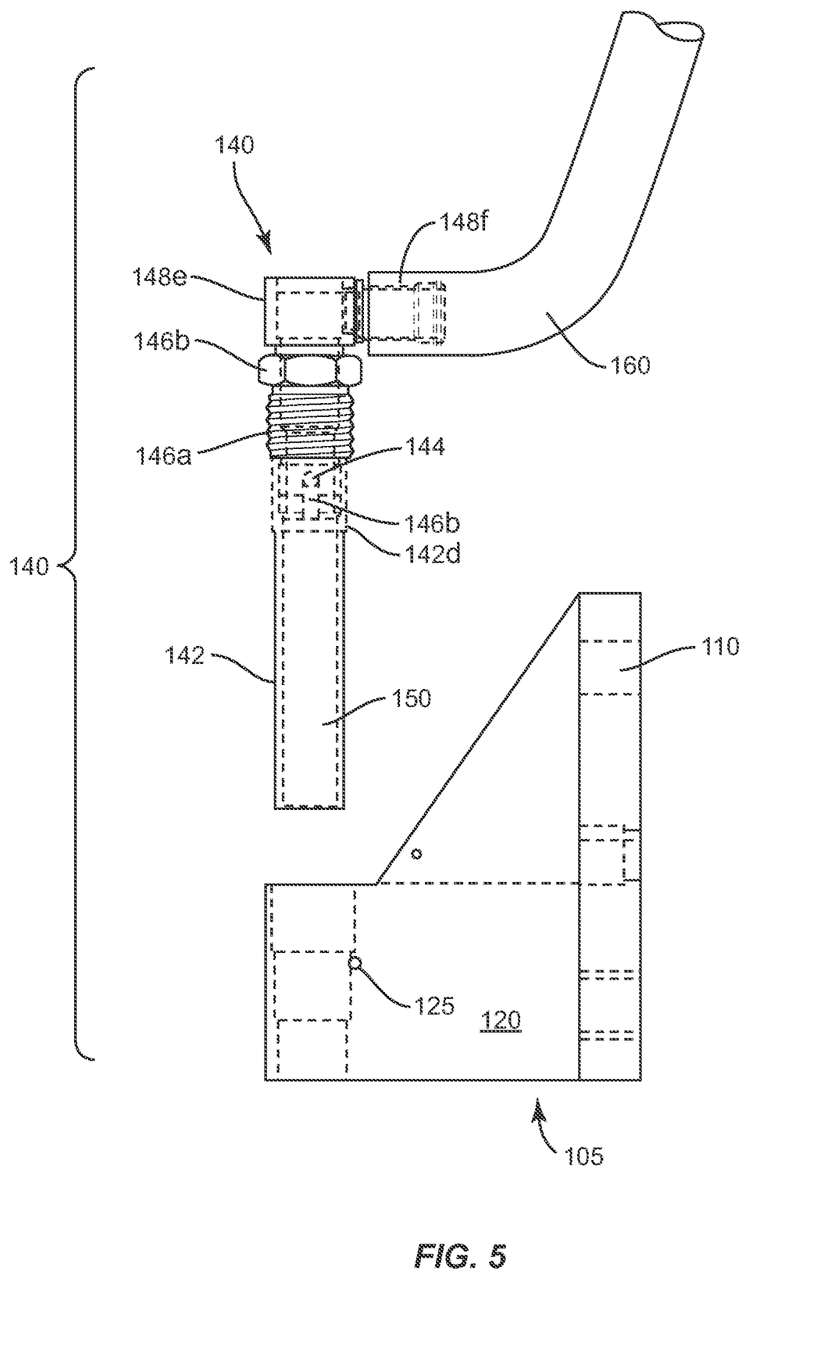
FIG. 5 is a side view of the traction motor speed sensor assembly, illustrating the partially assembled traction motor speed sensor.
Figure 6:
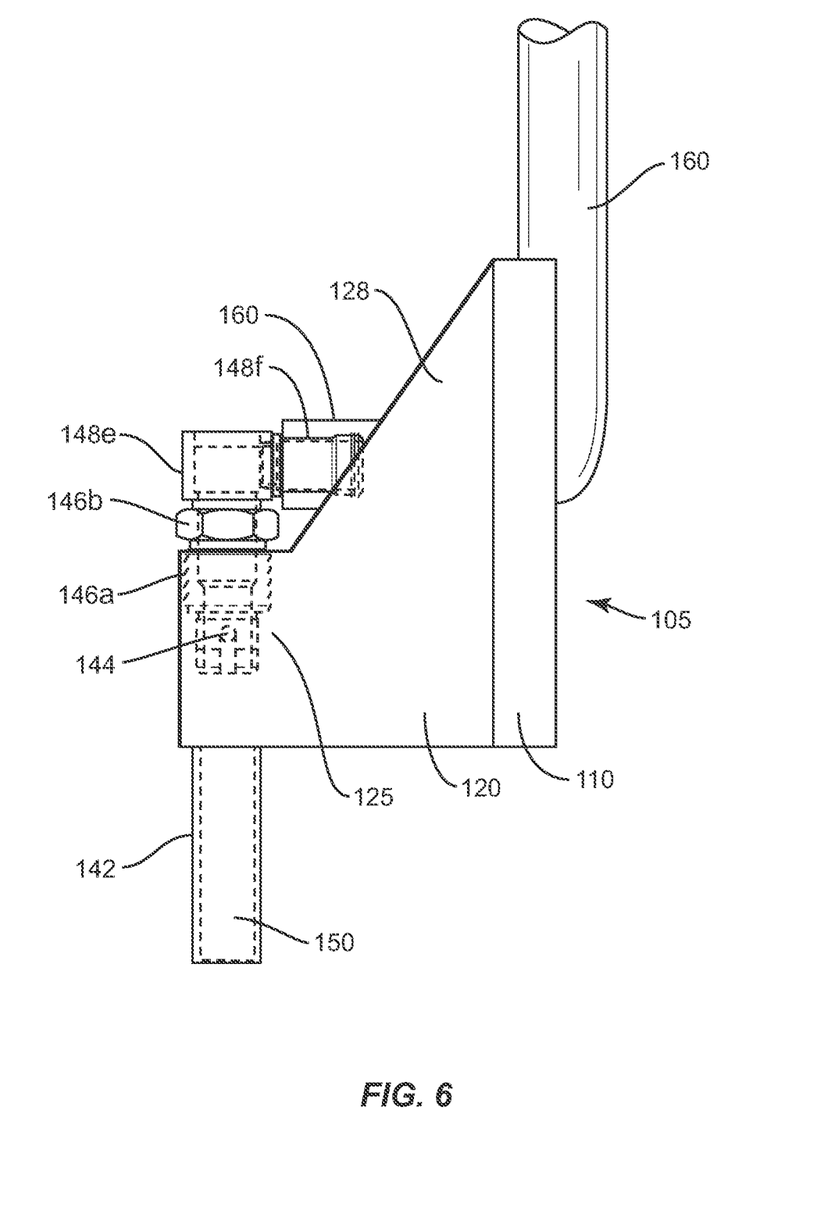
FIG. 6 is a side view of the completely assembled traction motor speed sensor assembly.

Turning now to FIGS. 4 through 6, the construction and installation of the sensor assembly 140 is illustrated. The sensor assembly 140 including cable 160 is preferably assembled as a unit and inserted into the mounting bracket. As shown in the exploded view of FIG. 4, the sensor assembly 140 comprises a tubular forward sensor housing or shell 142 that contains a proximity sensor 150, a rear housing member 148, a threaded connector 146, and an electrical cable 160. The sensor housing 142 has an exterior surface that is configured complimentary to the interior configuration of the hollow tubular portion 124.

As described above and as illustrated in FIG. 7, the proximity sensor 150 is properly aligned and sealed within the sensor shell 142. As used herein, a "proximity sensor" generally refers to an electronic device that is able to detect the presence of nearby objects, i.e., gears or exciters, without any physical contact, and to accurately measure rotational speed of the shaft. Such a sensor could be a Hall effect sensor, often used in such environments. Such a sensor is placed in an elongated barrel portion with the sensor at its forward end for sensing the velocity of the turning gear on the shaft.

Figure 7:
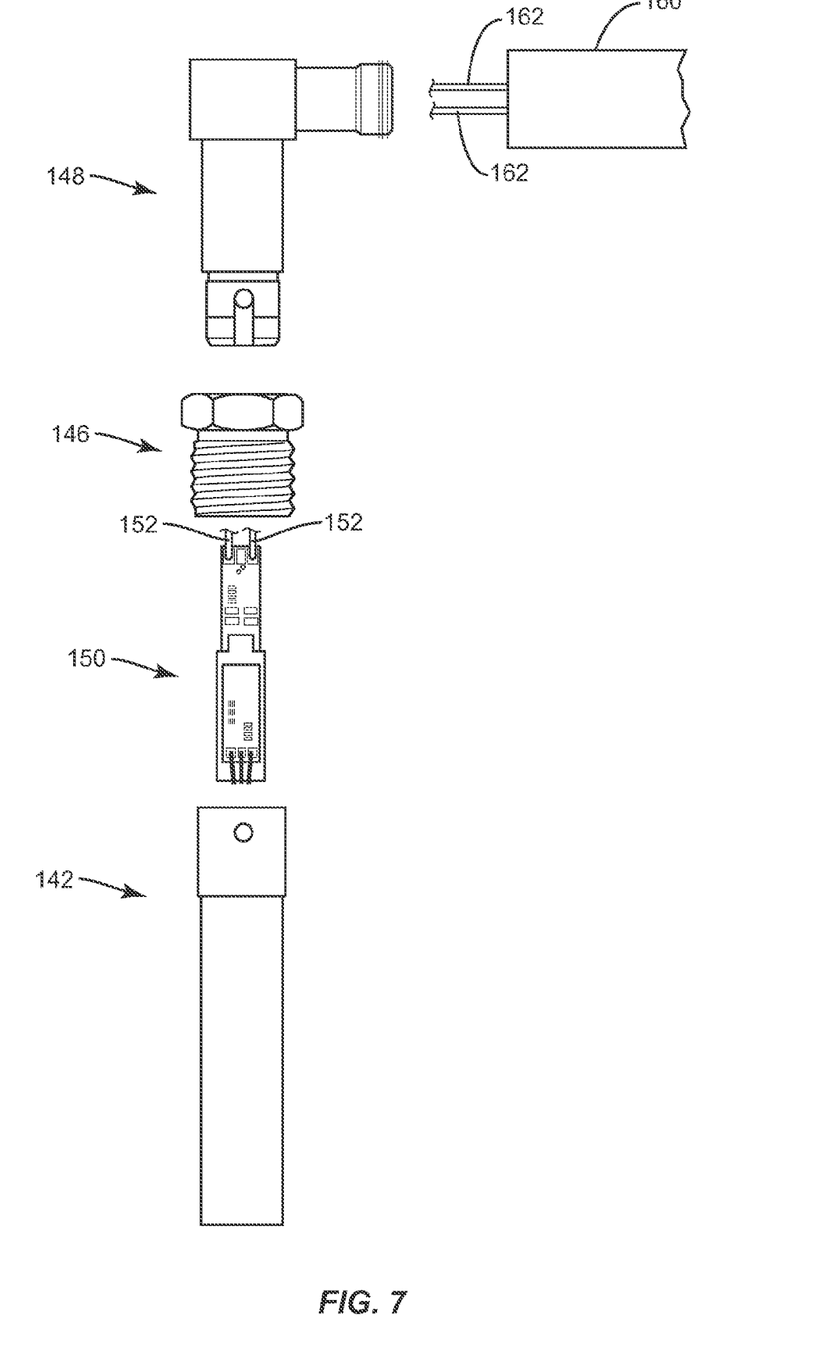
FIG. 7 is an exploded view of the sensor housing illustrating the speed sensor itself and its signal processing board.

As illustrated in FIG. 7, the Hall effect sensor 150, with its terminals and integrated circuit, are connected to the electrical cable by means of lead wires 152 from the Hall sensor 150 which extend through the rear housing member 148 and connects to corresponding wires 162 in cable 160. While Hall effect sensors are shown and described, other types of sensors, such as magneto register sensors or elements with similar characteristics, may be used so long as they are compatible with the mounting bracket with its base and sensor support arrangement.

The sensor shell 142 is sealed at its forward 142a end to protect the proximity sensor 150 from the environment. As is conventional, the end 142a may be sealed with a potting compound suitable for the environment or a stainless steel barrier. The sensor shell 142 is a generally hollow cylindrical tube machined from 300 series stainless steel. As best shown in FIG. 4, the sensor shell 142 comprises a forward portion 142c having a first diameter and a rear portion 142d having a slightly greater diameter. The difference in diameter between the forward portion 142c and the rear portion 142d forms a "shoulder" 142f which will ultimately engage the "shoulder" 124d between the leading hollow portion 124a and the intermediate hollow portion 124b of the hollow tubular portion 124. As will be better understood from the following description, the outside of the rear portion 142d is also formed/machined so that it has a generally flat surface 142e. This flat surface 142e engages and rests against roll pin 125, this insures the proper rotational alignment of the sensor assembly 140 in the hollow tubular portion 124 of the sensor mounting portion 122.

Generally cylindrical holes 142g also are drilled or machined through the opposed walls of the rear portion 142d. Once a sensor 150 is positioned inside the shell 142 with its leads 152 extending rearwardly therefrom, a second pin, preferably roll pins 144 are press fitted through each of the holes with its leads extending outwardly thereof. When inserted and installed, the roll pins 144 will be in a substantially horizontal orientation generally parallel to the base 120 and substantially perpendicular to the primary axis of the shell 142.

A threaded connector 146 comprises a threaded male, or bushing, portion 146a, which is configured to engage the threaded female portion 124f of the hollow portion 124c. The bushing portion 146a is also hollow, having an inner cylindrical shaped diameter. Threaded connector 146 terminates as a hex nut 146b which facilitates engagement of threaded bushing 146a with the threaded portion 124f in the mounting bracket 120, as best shown in FIG. 4.

Threaded connector 146 slips over outer diameter of 148d and becomes a captive, free turning threaded bushing. The end wall of threaded bushing portion 146a is approximately the same diameter as the adjacent end wall of rear portion 142d of sensor shell 142. Thus as connector 146 is tightened into threaded portion 124f, the sensor shell 142 will be held in place.

148a is pressed into 142b with the leads from sensor 150 extending therethrough. The roll pin provides alignment during the press together process. The second roll pin provides retention between front and rear housing.

Rear housing member 148 is constructed to properly align with and matingly engage a pin 144 that is press fitted through the rear housing portion 142d of the forward sensor body. The rear housing member 148 includes a forward portion 148a, an intermediate portion 148d, and a rear portion 148e. The forward portion 148a comprises a generally cylindrical mating surface or shoulder having a diameter that is dimensioned to press fit, or frictionally engage, the inner diameter of the rear housing portion 142d of the forward sensor body or housing 142. Note: the forward portion 148a may include a slight taper near the end to fabricate insertion into housing 142. A slot 148b is machined through the opposed walls on each side of the cylindrical mating surface 148a, opening at the forward end 148c of the mating surface 148a. As the rear housing member 148 is inserted into sensor shell 142, slots 148b will become seated on pins 144, thus insuring proper exit angle of electrical cable 160. Electrical cable 160 is also a part of the sensor assembly 140 and includes wires 162 which connect to the leads 152 from sensor 150 which extend through rear housing member 148. The intermediate portion 148d comprises a substantially hollow body allowing for passage of the leads 152. Lastly, a rear housing portion 148e, having a larger head size than the other portions of the rear housing portion 148 is hollow to provide a turning radius for the electrical cable 160. An opening in the side wall of the housing portion 148e permits connection of a hose/cable barb sleeve 148f, which, when installed, extends outwardly generally perpendicular to the motor head 120. Alignment of the roll pin 125 and flat 142e ensures this orientation.

As illustrated in FIGS. 4 through 6, one aspect of the invention is the ease of replacing a sensor assembly 140, wherein a mounting bracket of the type having a base 110 and sensor support 120 has previously been mounted through a ventilation opening 12 of a motor frame head 10 at a prescribed distance from an axis of rotation X-X of the motor, and wherein a sensor support extends from the inner surface of the base 110 through the ventilation opening for releasably receiving a sensor assembly 140

With the mounting bracket removed and the previous sensor assembly removed, installation of a replacement sensor assembly 140 begins. A new replacement sensor assembly 140 is aligned and fastened into the mounting bracket 110.

As the forward portion of the sensor housing 142, containing the sensing element(s) and signal processing circuit(s) is next inserted into the hollow tubular portion 124 the flat alignment surface 124e of the hollow tubular portion 124 aligns with the roll pin 125, which protrudes into and extends horizontally across the width of the hollow tubular portion 124. The housing 142 is inserted until the shoulder, or stop 142f, engages the shoulder or stop 124d of the intermediate hollow portion 124b of hollow tubular portion 124 of mounting bracket 105. At this point no further insertion is possible and the forward end 142a of the sensor housing 142 is precisely aligned and positioned with the precise air gap G required for the proper functionality of the assembly 140.

The bushing portion 146a of the threaded connector is next threaded into the threaded female portion 124f of the rear hollow portion 124c of the hollow tubular portion 124. So assembled the forward end wall of bushing 146 engages the adjacent end wall of sensor shell 142 to retain it in place.

When installed, the electrical cable 160 will extend outwardly toward the motor frame head for routing along the exterior of the frame head 10. A terminal end of the electrical cable 160 is subsequently connected to the locomotive motor control system. Cable 160 can be any suitable electric cable, but preferably a 6 conductor 20 gauge shielded cable, all of which is covered by trauma resistant flexible tubing. Any suitable electric cable suitable for the operating environment will function well here.

Although the present invention has been described with exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

I claim:

1. A speed sensor system for a locomotive traction motor of the type having a motor frame head adjacent to each wheel truck, the frame head including ventilation openings, the system comprising:
   (a) a mounting bracket, comprising:
      (i) a base having a width dimension sufficient to span one of the ventilation openings on the exterior of the frame head, the base having an inner surface attachable to the exterior surface of the frame head at a prescribed distance from an axis of rotation of the motor;
      (ii) a sensor support of such dimension as to be able to extend from the exterior surface through the ventilation opening, the support having a hollow tubular portion at the end thereof for releasably receiving a sensor assembly having a tubular shell, the hollow tubular portion extending generally perpendicularly to the axis of rotation of the motor and having an interior wall configured to receive, align, and position the tubular shell of the sensor assembly;
   (b) a sensor assembly removeably retained within the hollow tubular portion, comprising:
      (i) a tubular sensor shell containing a speed sensor adjacent to one end and having an exterior surface configured complimentary to the interior configuration of the hollow tubular portion wherein, when seated within the tube, the sensor will be properly positioned and aligned within the mounting bracket relative to the traction motor;
      (ii) a fastener for securing the sensor shell to the sensor support; and
      (iii) an electronic housing portion connected to the sensor shell for electronically interconnecting the sensor to an external signal processing source.

2. The speed sensor system of claim 1, wherein the mounting bracket further comprises opposed flange portions for mounting the bracket to the frame head in such a manner that the sensor support portion extends through the one ventilation opening.

3. The speed sensor system of claim 1, wherein an interior wall of the hollow tubular portion includes a shoulder that receives and seats a corresponding shoulder on the sensor shell for proper positioning thereof relative to the traction motor.

4. The speed sensor system of claim 1, wherein the hollow tubular portion extends along a support axis generally perpendicularly to the axis of rotation of the motor, the speed sensor system further including a pin extending generally perpendicular to the support axis and across the hollow tubular portion and a flattened mating surface on the exterior surface of the sensor shell to mate with a peripheral surface of the pin for properly aligning the sensor shell relative to the traction motor.

5. The speed sensor system of claim 1, wherein the sensor is a proximity sensor.

6. The speed sensor system of claim 5, wherein the sensor is a Hall effect sensor.

7. The speed sensor system of claim 1, wherein the fastener is a threaded bushing.

8. The speed sensor system of claim 1, wherein the electronic housing portion comprises a groove for mating alignment and engagement with a roll pin.

9. A speed sensor for locomotive traction motors of the type having a mounting bracket affixed adjacent the traction motor to be monitored, the mounting bracket including a sensor support having a hollow tubular portion that extends along a support axis generally perpendicularly to the axis of rotation of the motor with an internal configuration for releasably receiving the speed sensor, and a pin extending generally perpendicular to the support axis and across the hollow tubular portion, the sensor comprising:
   (i) a tubular sensor shell;
   (ii) a speed sensor element therein adjacent to one end,
   (iii) the sensor shell including an exterior surface configured complimentary to the interior configuration of the hollow tubular portion wherein, when seated within the tubular portion, the sensor will be properly positioned and aligned within the mounting bracket relative to the traction motor, the sensor shell having a flattened mating surface on the exterior surface thereof to mate with a peripheral surface of the pin for properly aligning the sensor shell relative to the traction motor, and
   (iv) an electrical cable having leads connected to the sensor element attached to the sensor shell.

10. The speed sensor according to claim 9 wherein the sensor shell includes a shoulder on the exterior surface that when mounted is received and seated against a corresponding shoulder on the interior surface of the tubular portion which achieves the positioning function.

11. The speed sensor according to claim 9 in which the speed sensor element is a Hall effect sensor.

* * * * *